UNITED STATES PATENT OFFICE.

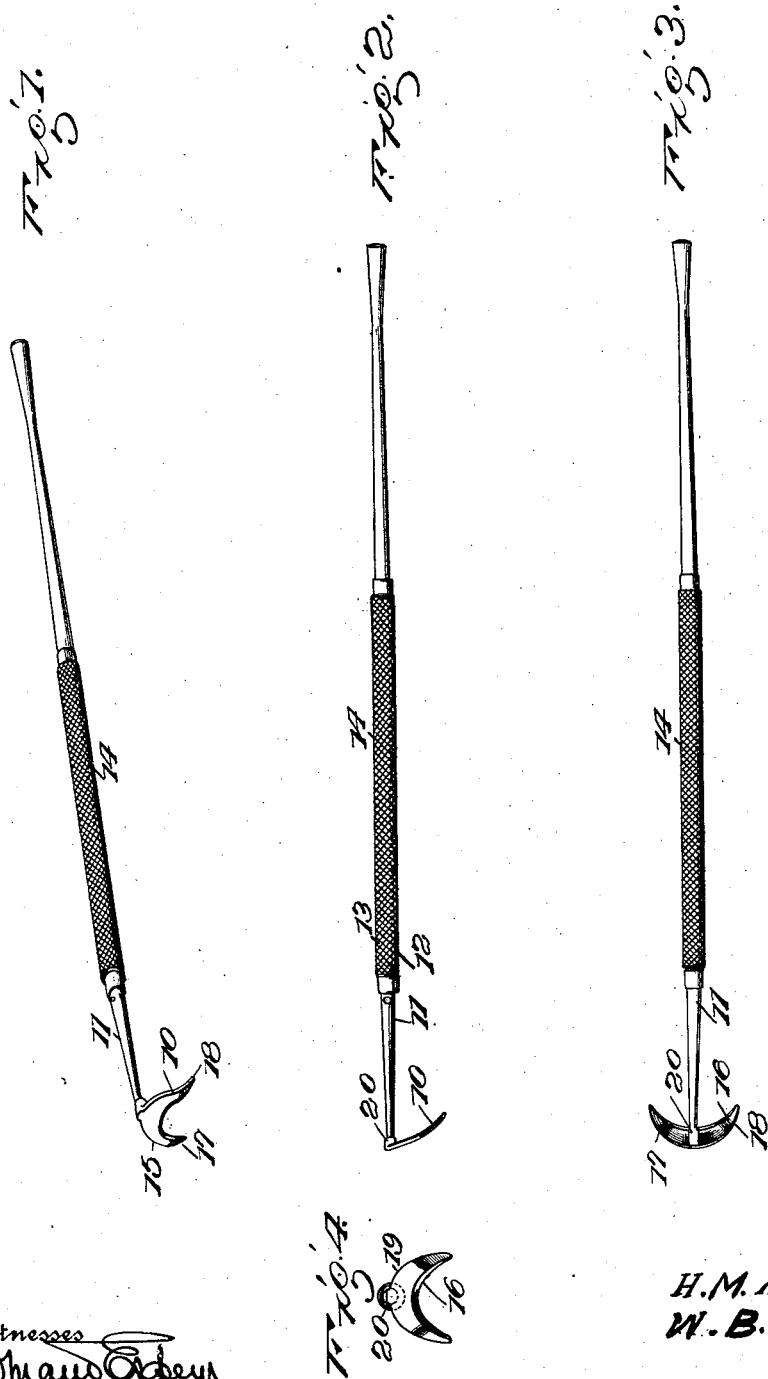

HARRY M. HOFFMAN AND WALTER B. GARRETT, OF CARUTHERSVILLE, MISSOURI.

DENTAL INSTRUMENT.

1,109,924. Specification of Letters Patent. Patented Sept. 8, 1914.

Application filed July 9, 1913. Serial No. 778,196.

*To all whom it may concern:*

Be it known that we, HARRY M. HOFFMAN and WALTER B. GARRETT, citizens of the United States, residing at Caruthersville, in the county of Pemiscot and State of Missouri, have invented certain new and useful Improvements in Dental Instruments, of which the following is a specification.

This invention relates to an improvement in dental instruments.

The primary object of the invention is to provide a lancet for the incision of gums which may be conveniently manipulated to accurately cut the gum, particularly of the molar or wisdom teeth, although the same is adapted for making incisions in the gums adjacent the cuspids or centrals.

A further object of the invention is to provide an implement by means of which an incision may be made in the gum behind the teeth as well as on both sides of the same, whereby the gum may be removed by rotating the instrument, the device being particularly adapted for removing the gum from the masticating surface of partially erupted wisdom teeth.

For a full understanding of the invention, reference is to be had to the following description and accompanying drawing, in which:—

Figure 1 is a perspective view; Fig. 2 is a side elevation; Fig. 3 is a plan view; and Fig. 4 is a front elevation of the cutting member.

Corresponding and like parts are referred to in the following description and indicated in all the views of the accompanying drawing by the same reference characters.

The cutting member 10 is mounted on a shank 11 which is threaded at 12, whereby the same may be inserted within the threaded barrel 13 of the handle 14. It will be noted that the handle may be of any suitable construction, and that the shank 11 may be secured thereto in any practical manner. The cutting member 10 consists of a substantially crescent-shaped blade 15 formed with a cutting edge 16 which extends to the end portions 17 and 18 of the blade. The blade is concaved longitudinally, both sides of the edge 16 being beveled to produce the cutting surface, the shank being secured to the central portion 19 on the concaved side of the blade. The blade is preferably formed with an extension 20 in which the terminals of the shank are secured, although any suitable method may be employed for securing the shank to the blade. The blade is disposed at an acute angle with respect to the shank, whereby the lancet may be used on the posterior surface of the wisdom teeth.

In operation, the cutting edge is placed against that portion of the gum posterior of the wisdom tooth, and pulled forward with a downward pressure of the lancet against the tooth and an upward pressure of the handle with a rotary motion of the instrument when it comes in contact with the tooth, so that the gum may be cut along both sides of the tooth as well as posterior to the tooth. It will be seen that by the peculiar configuration of the blade, it is given a wide range in cutting the gum on teeth of different configurations, and that the gum adjacent the masticating surface of the teeth is completely removed both at the back of the tooth and at the sides.

The many advantages of a construction of this character will be clearly apparent, as it will be noted that the gum may be effectually removed by the instrument being brought into contact with the same, and that repeated cutting at the gum is, therefore, avoided. Particular attention is called to the peculiar formation of the blade, whereby its cutting action is made possible, and to the fact that the instrument may be conveniently manipulated without danger of cutting the gum of the teeth adjacent that of the tooth which is being operated upon. It will also be obvious that the structure may be easily and economically manufactured, and that the supporting shank for the blade may be supported on handles of different configurations.

What we claim is:

1. A dental instrument including a shank and a blade which is crescent-shaped in front elevation and is transversely curved whereby its terminals are directed rearwardly toward the shank.

2. A dental instrument including a shank and a blade, said blade being formed with a relatively wide central portion and tapering from the central portion toward each terminal, the terminals being pointed and bent rearwardly.

3. A dental instrument including a shank, and a blade extending at an acute rearward angle thereto, said blade being crescent shaped in front elevation and transversely curved, whereby its terminals are directed rearwardly toward the shank.

In testimony whereof we affix our signatures in presence of two witnesses.

HARRY M. HOFFMAN. [L. S.]
WALTER B. GARRETT. [L. S.]

Witnesses:
WALTON M. COLLINS,
EDWIN S. HOFFMAN.